Patented June 15, 1937

2,084,033

UNITED STATES PATENT OFFICE 2,084,033

DICHLOROHYDROXYDIPHENYL

Russell L. Jenkins, Webster Groves, Mo., assignor to Monsanto Chemical Company, St. Louis, Mo., a corporation of Delaware No Drawing. Application August 26, 1936, Serial No. 98,065

2 Claims. (Cl. 260—154)

The present invention relates to a new phenol: 4,4'-dichloro-2-hydroxydiphenyl. This compound has an unexpectedly high phenol coefficient against several classes of micro-organisms, which property permits of its extended use in the preparation of antiseptic and disinfectant compositions.

It is an object of the invention to provide a new compound of wide utility, particularly for use as an antiseptic and disinfectant. Another object of the invention is to provide an economical and convenient method for the production of the compound. Further objects of the invention, which include the method of preparing antiseptic and disinfectant compositions from the new compound, will be apparent from the description hereinafter.

The compound is obtained by reducing 2-nitro-4,4'-dichlorodiphenyl to the aminodichlorodiphenyl, which is then diazotized and hydrolyzed to the desired 2-hydroxy-4,4'-dichlorodiphenyl.

4,4'-dichloro-2-hydroxydiphenyl is a white to tan colored needle-like crystalline solid with a melting point of approximately 78° C. The compound is an antioxidant or age-resistor for rubber, vegetable and mineral oils, particularly gasoline and lubricating oil distillates, and is a raw material for the production of synthetic resins, and for the preparation of insecticides.

The antiseptic and disinfecting action of 4,4'-dichloro-2-hydroxydiphenyl is particularly remarkable. When tested according to the standard method of the U. S. Food and Drug Administration (G. L. A. Ruehle and C. M. Brewer, U. S. F. D. A. Circular No. 198) the product exhibits in solution in 9.5% ethyl alcohol at a dilution of 1:20,000 a phenol coefficient of 305.5 against *Bacillus typhosus* and a coefficient of 333.3 against *Staphylococcus aureus*. Although a phenol coefficient of this magnitude is not exceptional against one or the other of these organisms, it is remarkable that the coefficient is equally high for both organisms. Thus its effectiveness as a general antiseptic, germicide and disinfectant is apparent.

The following table of comparative results illustrates the effectiveness of my compound.

| | Phenol coefficients | |
|---|---|---|
| | B. typhosus | Staph. aureus |
| 4-chloro-2'-hydroxydiphenyl | 116.6 | 88.8 |
| 2-chloro-4'-hydroxydiphenyl | 111.1 | |
| 3-chloro-2-hydroxydiphenyl | 97 | 100 |
| 4,4'-dichloro-2-hydroxydiphenyl | 305.5 | 333.3 |
| 2-diethylmethyl-3,5-dimethyl-4-chloro-phenol | 13 | 1143 |
| 2-isopropyl-3,5-dimethyl-4-chlorophenol | 81.3 | 313 |
| 6-diethylmethyl-3-methyl-4-chlorophenol | 23.3 | 625 |

Antiseptic and disinfectant solutions can be prepared from the dichlorohydroxydiphenyl of the invention by known methods. A convenient method of making such solutions for commercial use consists in dissolving them in water with the aid of a sulfonated castor oil. For this purpose, a commercial oil known as Nopco No. 1597 (National Oil Products Company of Harrison, New Jersey) is especially suitable and a convenient solution consists of 1 part by weight of the compound of the invention, 2 parts of oil, and 47 parts of water, together with a small proportion of ethyl alcohol to make a clear solution. Such a solution is dilutable with water to obtain solutions of desired phenol coefficients. A solution prepared from 1 part of 4,4'-dichloro-2-hydroxydiphenyl, 2 parts of Nopco No. 1597 and 47 parts of water and a small proportion of alcohol has a phenol coefficient at 20° C. of 5.55 toward *B. typhosus* and 4.16 toward *Staph. aureus*. A solution of 1 part of the dichlorohydroxydiphenyl, 3 parts of Nopco No. 1597 and 46 parts of water and a small proportion of ethyl alcohol has phenol coefficients of 2.77 and 2.5, respectively, toward *B. typhosus* and *Staph. aureus*.

A method of preparing the 4,4'-dichloro-2-hydroxydiphenyl of the invention follows:

*A. Preparation of 4,4'-dichloro-2-aminodiphenyl*

For this preparation 1000 grams of 4,4'-dichloro-2-nitro-diphenyl, 60 grams of concentrated hydrochloric acid (sp. gr. 120), 578 grams of iron filings and 501 cc. of water are used. The water and acetic acid are placed in a flask together with about one-quarter of the specified quantity of iron filings and the mixture is agitated for 20 minutes. The dichloronitrodiphenyl is added in portions of about 100 grams (1/10 of total quantity to be added) every 10 minutes. Stirring is maintained throughout the entire reduction. The remainder of the iron filings are also added in small portions, the additions of the dichloronitrodiphenyl and iron filings being made in such a manner that there is always an excess of iron present, that is, that at no stage is the iron entirely converted.

The mixture is then refluxed for 4 hours and the excess hydrochloric acid is neutralized with a small portion of sodium carbonate. The resulting oil is decanted and the residue left is extracted with six portions (250 cc. each portion) of benzene. The oil and the benzene extractions are combined and filtered, the benzene is evaporated and the remaining product is distilled in vacuum. The distillate, consisting of 4,4'-dichloro-2-amino-diphenyl, has a boiling point of approximately 170° to 175° C. at a pressure of 4 millimeters of mercury and melts at about 91° C.

B. Preparation of 4,4'-dichloro-2-hydroxydiphenyl

A suspension of the hydrochloride of 4,4'-dichloro-2-aminodiphenyl is prepared by melting 170.3 grams of the amine and adding it to a hot solution of 813 cc. of concentrated hydrochloric acid (sp. gr. 1.20) and 1500 cc. water. The solution is cooled. While stirring there is added in small portions to this suspension a solution of 48 grams of sodium nitrite in 100 cc. of water, the additions being made at a slow rate and the temperature being maintained below 10° C. After all the sodium nitrite has been added the mixture is allowed to warm up to 20° C. and 10 grams or less of urea in solution in water is added until the excess nitrous acid is destroyed. The addition of urea at this point may be made conveniently in small portions until the resulting mixture fails to react to potassium iodide-starch paper.

The slurry of yellow crystals is then poured into 4500 cc. of boiling 25% sulfuric acid and the mixture is allowed to stand and cool. An oil separates at once and gradually crystallizes. The supernatant liquid is poured off and filtered. The crystalline residue is extracted with 2% sodium hydroxide solution in quantity sufficient to dissolve the resulting dichlorohydroxydiphenyl and the solution is filtered. The clear filtrate is acidified and the resulting crystals are dried. The 4,4'-dichloro-2-hydroxydiphenyl thus obtained when purified by distillation in vacuum has a melting point of 78° C.

Inasmuch as the specification comprises preferred embodiments of the invention it is to be understood that the invention is not to be limited thereto and that other methods may be equally applicable to the production of the product of the invention. Similarly, although the use of the compound as an antiseptic and disinfectant is particularly emphasized, other uses, some of which have been specified, are contemplated.

What I claim is:

1. The compound 4,4'-dichloro-2-hydroxydiphenyl.

2. The phenol obtained by diazotization and hydrolysis of 4,4'-dichloro-2-aminodiphenyl, which phenol when pure is a crystalline, practically colorless product melting at approximately 78° C. and possessing pronounced germicidal action upon both *Bacillus typhosus* and *Staphylococcus aureus*.

RUSSELL L. JENKINS.